United States Patent [19]

Rosain et al.

[11] 4,329,607
[45] May 11, 1982

[54] SYNCHRONOUS ELECTRIC MOTOR WITH VERY LITTLE ROTOR INERTIA AND BALANCED CONICAL MOTION

[75] Inventors: Claude Rosain, Paris; Alexandre Torossian, Boulogne Billancourt, both of France

[73] Assignee: Societe Francaise d'Applications Industrielles et Rurales d' Electricite (S.F.A.I.R.E.), France

[21] Appl. No.: 177,684

[22] PCT Filed: Apr. 19, 1979

[86] PCT No.: PCT/FR79/00033

§ 371 Date: Dec. 19, 1979

§ 102(e) Date: Dec. 18, 1979

[87] PCT Pub. No.: WO79/00951

PCT Pub. Date: Nov. 15, 1979

[30] Foreign Application Priority Data

Apr. 19, 1978 [FR] France .................................. 78 11473

[51] Int. Cl.³ ............................................. H02K 7/06
[52] U.S. Cl. ....................................... 310/82; 310/80
[58] Field of Search ............................. 310/80–83, 310/49, 162–165

[56] References Cited

U.S. PATENT DOCUMENTS 3,117,244 1/1964 Rosain et al. ....................... 310/82
3,322,984 5/1967 Anderson ........................... 310/82
3,411,026 11/1968 Rosain et al. ....................... 310/82
3,456,139 7/1969 Newell ............................. 310/82 X Primary Examiner—Donovan F. Duggan
Attorney, Agent, or Firm—William A. Drucker

[57] ABSTRACT

Synchronous motor wherein an eccentric piece (6) mounted on the shaft (5) cooperates with a ball joint of which the outer cage is an integral part of the surface of the rotor (21) to maintain a predetermined tilting of the axis (0'0) of the rotor with respect to that of the stator. Application to the making of step-by-step motors.

12 Claims, 8 Drawing Figures

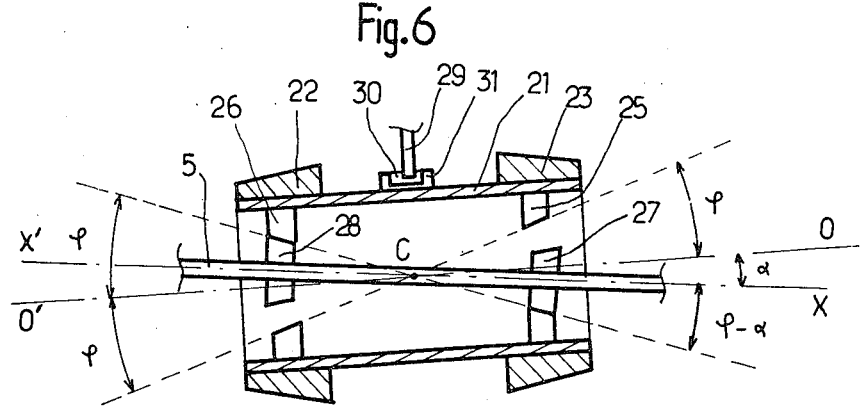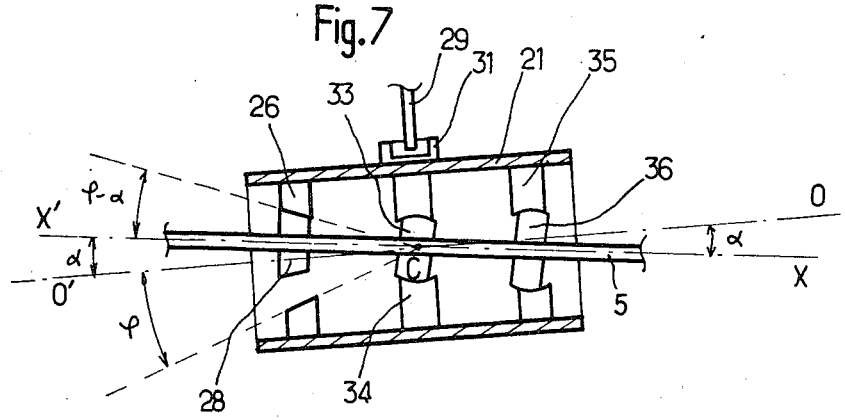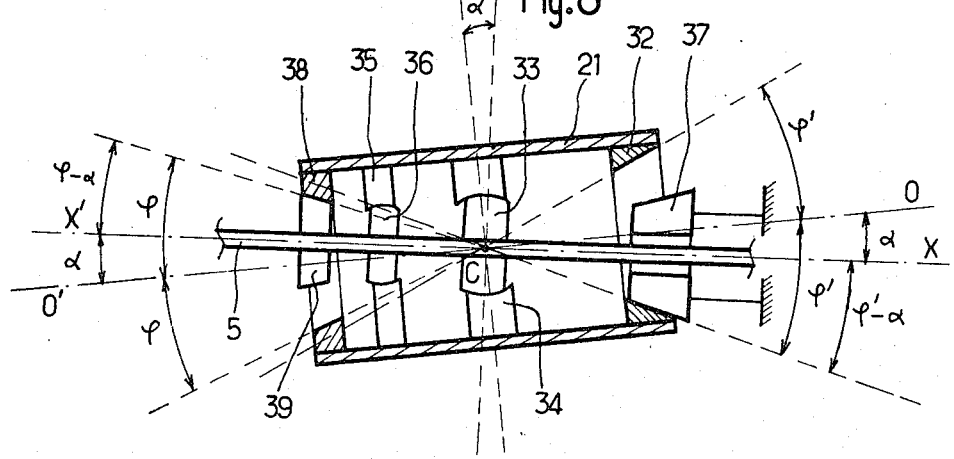

SYNCHRONOUS ELECTRIC MOTOR WITH VERY LITTLE ROTOR INERTIA AND BALANCED CONICAL MOTION

TECHNICAL FIELD AND POSSIBILITY OF INDUSTRIAL APPLICATION

The invention has for its object an alternating current motor of the synchronous type designed to have a particularly low rotor inertia and, at rest, a returning couple towards one amongst several positions of stable equilibrium, which makes it particularly suitable for cyclic services and for stepping function. The conception of this motor does not bring about any limitation so far as concerns its useful power. It can be constructed in such a manner as to turn slowly, without addition of an external speed reducer.

PRIOR ART

The French Pat. No. 1231097 filed Mar. 25th 1959 in the names of Claude Rosain and Georges Sterbatcheff for: "Alternating current slow speed motor" describes a motor of the synchronous type in which a small rotor inertia is obtained due to the fact that the rotor rolls without sliding on a rolling path fast with the stator and, because of this fact, does not undergo rapid rotation about its own axis. This motor thus only permits the obtaining of movements which are slow with respect to the pulsing of the rotating field and moreover poses, because of the vibrations generated by the hypocycloidal movement, difficult problems of suspension.

The magnetic circuit of its stator necessarily has the feature of being arranged so that the rotating field shall be dephased by 180° between the two gaps comprised in the respective extremities of the rotor, which distinguishes its construction from that of traditional magnetic circuits. Finally the balancing of such a motor can only be obtained at the price of artifices which complicate construction.

DISCLOSURE OF THE INVENTION

The invention proposes to free itself from these inconveniences by using a stator magnetic circuit of the traditional type producing a field rotating in the same direction at both extremities of the rotor, and by maintaining, by means of at least one element eccentric with respect to the shaft of the motor, a constant inclination of the axis of the rotor with respect to that of the stator, so that the rotor carries out a conical movement.

As a result of this conical movement there is obtained a particularly low rotor inertia and, taking into account the fact that the magnetic circuit further has a symmetry of revolution, the motor has several positions defining a minimum gap and consequently a stable equilibrium.

The motor in accordance with the invention thus comprises a rotor and a stator defining between them a gap at each end, each having an axis of revolution and a common centre of symmetry at the intersection of these two axes, a stator winding fed and arranged to generate a field rotating in the same direction in the two gaps and means for polarising magnetically, with opposite polarities, the two extremities of the rotor, and is characterised by means for maintaining at a constant value the inclination of the axis of the rotor with respect to that of the stator and for converting the conical movement of the rotor thus obtained into a rotation of the shaft of the motor.

According to a first manner of construction, the said means comprise at least one element eccentric with respect to the shaft of the motor and cooperating with a bearing of which the exterior cage is fast with the surface of the rotor.

According to a second manner of construction, the said means comprise at least one pinion or a wheel centred on the shaft of the motor and cooperating with a crown fast with the surface of the rotor, the said pinion and the said crown having a conical surface the apex of which coincides with the said centre of symmetry, the axis of the crown being inclined with respect to the shaft.

The various features, as well as the advantages of the invention, will appear clearly in the light of the following description.

In the attached drawing:

FIG. 1 is a view in axial section of a motor conforming to a first manner of construction of the invention, and which

FIG. 6 shows schematically the rotor of a motor conforming to the second manner of construction;

FIG. 7 shows schematically the rotor of a motor conforming to a variation of the construction of FIG. 6, and FIG. 8 shows schematically the rotor of a motor conforming to a variation of the second manner of construction.

Figure 2:
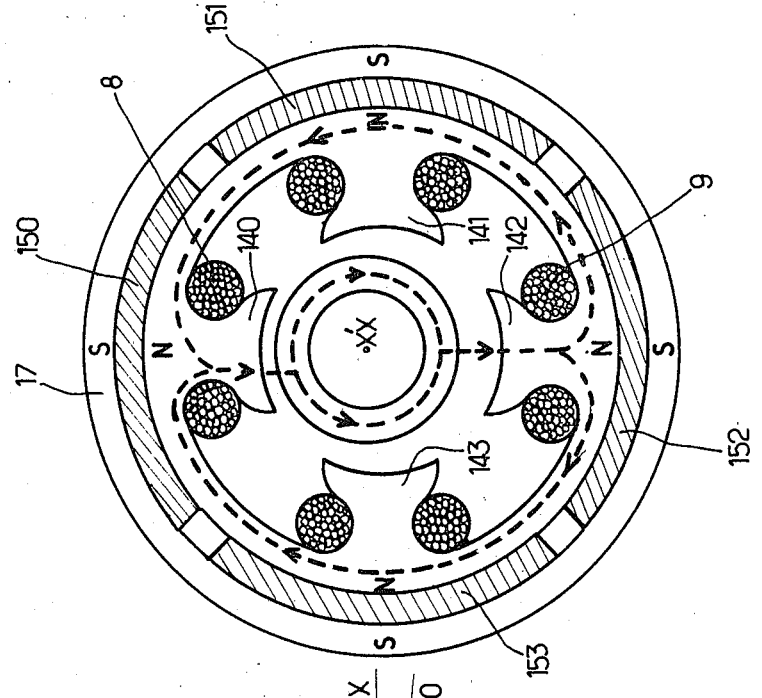
FIG. 2 shows in transverse section.
Figure 1:
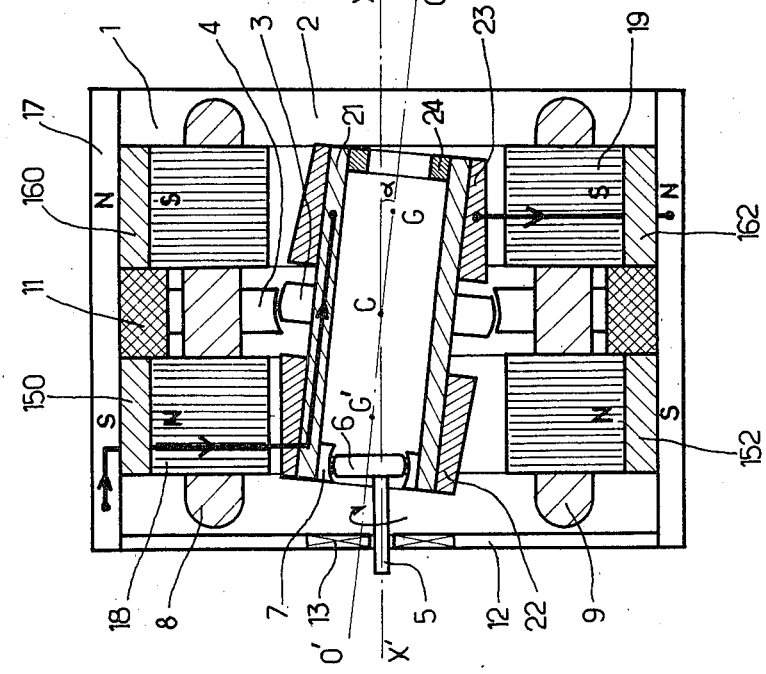

In FIGS. 1 and 2 there is shown a motor comprising a stator 1 having a horizontal axis of symmetry X'X and, on this axis, a centre of symmetry C. This stator houses a rotor 2 having the same centre of symmetry C and an axis of symmetry O'O which makes a constant small angle $\alpha$ (preferably less than 4°) with the axis X'X. The means for maintaining the centre of symmetry of the rotor at the fixed point C and for obtaining the conical movement of the rotor, that is to say for limiting the angle $\alpha$, comprise in the manner of construction described a plain bearing or ball bearing comprising a spherical inner cage 3 centred at C mounted on the cylindrical cage 21 of the rotor, in a plane perpendicular to the axis O'O and which cooperates with a cage 4 fast with an annular element 11 of the stator and likewise having a spherical bearing face.

The stator is provided, at one extremity, with a cheek 12 which carries a rigid rolling bearing 13 which supports a shaft 5 having its axis on X'X.

This shaft is fast with an eccentric 6 itself supported at the interior of the cage 21 by a universal ball bearing 7.

Figure 3:
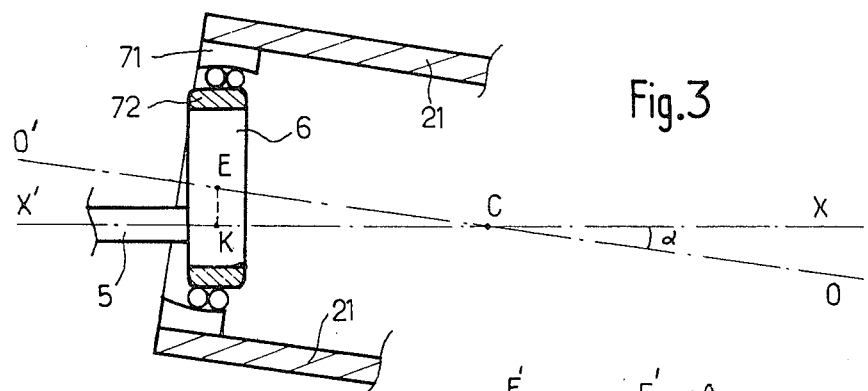
FIG. 3 shows the detail of a ball bearing which serves for driving the shaft by the rotor.

There is shown, in FIG. 3, the eccentric 6 of circular shape and centred at a point E of the axis O'O situated at a distance EK=CE sin $\alpha$ from X'X. The bearing 7 comprises an external cage 71, with spherical bearing face, centred at E fast with the cage 21 and an internal cage 72 fast with the periphery of the eccentric. The angle $\alpha$ has been very much exaggerated in FIG. 3.

Turning again to FIG. 1, it is seen that the rotor is provided at its extremities with two polar enlargements 22 and 23 of conical external surface, the half-angle of the apex of the cone being equal to $\alpha$.

In FIG. 2 it is seen that the profile of the metal plates of the stator form at each end four poles 140, 141, 142, 143, the extremity of which has the shape of a portion of a cylinder having its axis on X'X. Thus, in the course of rotation of the axis O'O about X'X, there are four positions of the rotor for which there exists, between each polar enlargement and one of the poles of the stator, a minimum gap of constant length. In FIGS. 1 and 2, this minimum gap appears between the pole 140 and the polar enlargement 22. Its length, for example equal to 0.4 mm., has been very much exaggerated in the drawing.

In a preferred manner of construction, the magnetic circuit of the motor comprises permanent magnets constituted by "tiles" or sectors carried by the stator. These magnets number four at each extremity of the stator in the example described, and are designated by the reference numerals 150 to 153 and 160 to 163. They are magnetised radially, the north poles being for example on their external surface for the magnets 160 to 163 and on their internal surface for the magnets 150 to 153. These magnets are fixed at each side of the annular support member 11 which is centred at C and constituted of a magnetic material. They are surrounded by an annular sleeve 17 of soft magnetic material.

At each extremity of the stator, a stack of magnetic plates (18 and 19 respectively) is housed in the interior of the magnetic and fixed on a face of the member 11. It is seen, in FIG. 1, that each stack has the same width as the corresponding magnets. Four windings such as 8,9 surround the four poles.

The cage and the polar enlargements of the rotor are, in the manner of construction described, of soft magnetic material.

Figure 4:
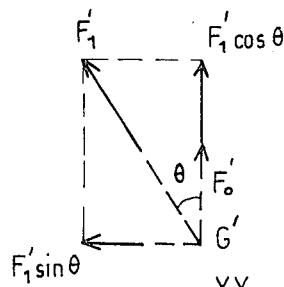
FIG. 4 is a diagram of the fields and of the forces of attraction intended to illustrate the operation of the motor.
Figure 4:
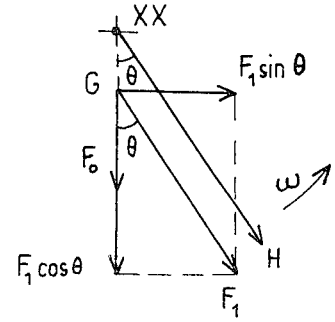

There will now be explained the operation of the motor described with reference to FIG. 4.

When the windings are excited by a polyphase alternating current, a rotating field H identical to that which would be produced by a magnet rotating at the speed $\omega$ about the axis X'X ($\omega$ being the frequency of the current) is generated in each of the gaps. Furthermore, the rotor is polarised by a fixed magnetic field, provided by the magnets.

As a result of this polarisation, forces of attraction are manifested between the stator and the polar enlargements of the rotor. The resultant of these forces is, at each extremity of the rotor, applied to the centre (respectively G,G') of the magnetic masses distributed at this extremity (that is to say at a point of the axis O'O) and directed radially towards the variable position of the minimum gap. Assume Fo and F'o to be the two resultants (FIG. 4). It can be shown that they make, with the direction of the field H, an angle of retardation $\theta$ which intersects with the resistant couple exerted on the shaft 5 of the motor.

The field H exerts for its part some forces of attraction the resultants F1 and F'1 of which applied respectively at G and G' are parallel to H and directed in opposite directions to each other. Each of these resultants F1 and F'1 can be decomposed into two forces one of which is directed along Fo (or F'o respectively) and the other along the normal to Fo (or F'o respectively). The two forces F1 sin $\theta$ and F'1 cos $\theta$ thus obtained add themselves respectively to Fo and F'o in order to form a couple tending to tilt the rotor; this couple is annulled by the reaction of the cage 71 on the eccentric and the angle $\alpha$ is thus maintained at a fixed value.

The two forces F1 sin $\theta$ and F'1 sin $\theta$ form a couple which tends to turn G and G' (that is to say the centres of symmetry of the two extremities of the rotor: FIG. 1) about the axis X'X at the angular velocity $\omega$.

The axis of the rotor thus carries out a conical movement, of half-angle at the apex $\alpha$, about the axis X'X.

The eccentric 6 is thus itself driven at the velocity $\omega$ about X'X.

It will be noted that the geometry of the motor is such that the rotor defines, in the course of its conical movement, as many positions corresponding to a minimum gap as the stator comprises polar enlargements (that is to say four in the example described). As a result the motor possesses several positions of stable equilibrium. When the motor is halted, a returning couple brings it to the closest position of stable equilibrium.

Another remarkable property of the motor described is the very low amount of inertia of the rotor. As this latter does not rotate about itself (or, perhaps, turns at a very low speed), its moment of inertia is reduced, for each elementary slice of its volume perpendicular to its axis, to that which corresponds to the rotation of the mass of this slice considered as concentrated at its centre of gravity G, about the axis X'X. It is finally shown that the total inertia of the rotor is equal to $\frac{5}{8}$ M (L/2 sin $\alpha)^2$, L being the length of the rotor. This quantity is very small, taking into account the small value of $\alpha$. Thanks to the properties which have been set out above, the motor described will be particularly adapted to a stepping function.

Furthermore, the rotor by reason of its symmetry with respect to the point C is perfectly balanced and thus does not generate any mechanical vibration. To take into account the mass of the eccentric there is disposed at the opposite extremity of the cage 21 an annular balancing mass 24 (FIG. 1).

As the forces F1 and F'1 are proportional to the product of the rotating field and the continuous flux in gap, and as the amplitude H cannot exceed a value compatible with the admissible heating of the motor, it is interesting to give to the continuous flux as high a value as possible. This result is obtained by giving a large surface to the magnets.

By way of example, by using normal stator plates and magnets, the arrangement described permits the obtaining of a surface of the magnets double that of the gap. Now, the surface of a toroidal magnet placed in the rotor would only be a third of that of the gap, and thus the induction obtained would finally be six times more weak.

It will be noted moreover that, in the arrangement described, the continuous flux closes on itself along the path shown in full lines in FIG. 1, whilst the alternating flux closes on itself along the path shown in dotted lines in FIG. 2, without traversing the magnets (the reluctance of which is very high). There is thus no tendency to demagnetise the magnets, which is a supplementary advantage.

For these diverse reasons, the arrangement shown in FIGS. 1 and 2 will be the most often preferred in practice. This arrangement is however not limitative.

Figure 5:
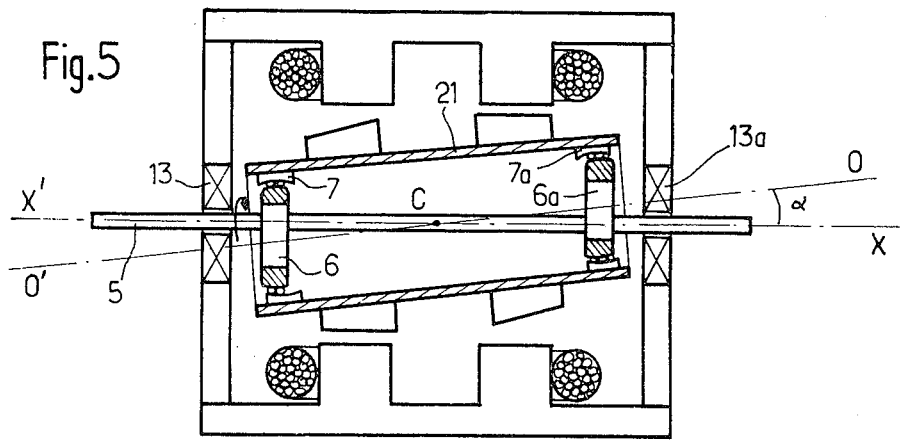
FIG. 5 shows schematically a variation of construction of a motor conforming to the first manner of construction.

In the manner of construction described, the centre C of the movement of the rotor is materialised by a bearing. By way of variation it would be possible to eliminate this bearing (3, FIG. 1) and replace the mass (24)

by a second eccentric 6a cooperating with a second universal ball bearing 7a (respectively identical to the elements 6-7 of FIG. 1). The shaft 5 would then completely traverse the interior of the rotor cage and would be supported by two rigid bearings carried by the two cheeks of the stator. Such an arrangement has been shown schematically in FIG. 5. Of course, the two eccentrics 6 and 6a must be symmetrical with respect to the point C, that is to say their centres are situated at each side of the axis XX' and at equal distances therefrom.

In FIG. 6 there is shown a rotor comprising a cage 21 which houses, at its respective extremities, two crowns 25-26 symmetrical with respect to C and of which the internal surface is a portion of a cone centred at C, having as axis O'O and a half apex angle $\phi$. The motor comprises a shaft 5 which completely traverses the rotor and is supported by two bearings which are provided on the cheeks of the stator (not shown). The shaft 5 carries two symmetrical pinions 27-28 having a conical surface centred at C having for their axis XX' and a half angle at the apex ($\phi$-$\alpha$). The rotor comprises also two polar enlargements 22-23 having the same shape as those of FIG. 1 and cooperating in the same manner with a stator identical to that of the motor of FIG. 5 (itself identical, so far as concerns the bearings for supporting the shaft, to that of FIGS. 1 and 2).

The conical movement of the rotor about the axis X'X is thus identical to that of the rotor of those motors.

The crowns 25, 26, in the course of this conical movement of the rotor, drive the pinions 27 and 28 with which they are constantly in contact along a generator of a cone of half-angle ($\phi$-$\alpha$).

It can be shown that the angular speed of rotation of the shaft 5 is, with respect to the angular velocity $\omega$, divided by the ratio $$\rho = \frac{\sin(\phi - \alpha)}{\sin\phi - \sin(\phi - \alpha)}$$

The shaft 5 being supported by two rigid bearings can obviously not undergo translation and the cooperation of the pinions 27 and 28 with the crowns 25 and 26 results in fixing of the centre C of the movement of the rotor and limiting the tilting. The rotor would, on the contrary, have a tendency to turn about its own axis by reason of the reaction to the resistant couple. This movement must be prevented, and this is obtained by means of a rod 29 fast to the stator and of which the extremity cooperates with the recess 30 of a ring 31 fixed on the periphery of the rotor. The recess 30 has a width (dimension along a direction perpendicular to the plane of the drawing) only a little greater than the diameter of the rod, which prevents any rotation of the rotor about the axis OO'. On the other hand, the length of the recess (dimension in the direction OO') is sufficient to permit the conical movement of the rotor.

It will be noted that it would be possible, by way of variation, to make the pinion fast with the external surface of the rotor and the crown fast with the stator.

It will also be noted that, in the arrangement of FIG. 6, the centring of the rotor at the point C is only obtained by the equilibrium of the magnetic forces due to the symmetry of the structure. Under these conditions, the crowns 25-26 and the pinions or wheels 27-28 would advantageously be smooth, the drive being obtained by friction. If they were toothed, for a too high resistance couple there could occur in effect a lack of meshing of the teeth. In effect the tilting couple decreases when the dephasing between the minimum gap and H increases.

In the variant of FIG. 7, wherein the same reference numerals designate reference numerals homologous to those of FIG. 6, the centre C is, on the contrary, fixed by a bearing 33-34, analogous to that of FIG. 1. Furthermore, if at one extremity of the rotor there is found the crown 26 and the pinion 28 of the FIG. 6, at the other extremity they are replaced by a ball bearing 35-36. The lower cage 36 not being eccentric with respect to X'X, this bearing does not ensure the driving of the axis 5. On the other hand, the external cage 35, being centred at O'O, is thus eccentric with respect to the shaft 5, in such a manner as to assure the maintenance of the angle $\alpha$, which avoids unmeshing of the pinion 28. The mass of the cage 35 balances that of the crown 26.

The drive of the shaft is assured by the cooperation of the pinion 28 and the crown 26, preferably toothed, having obviously toothing of the same nature.

The ratio of reduction is the same as in the motor of FIG. 6.

In the variation of FIG. 8, there is found the central bearing 33-34 which assures the fixing of the point C and the bearing 35-36 with eccentric external cage intended to maintain the angle $\alpha$, but the rotation of the rotor 21 about itself is not locked. The cooperation of a conical crown 32, of half apex angle $\phi$, fast with the cage 21, with a crown 37, fast with the stator and of half apex angle $\phi'$-$\alpha$, has for its effect to impose on the rotor, in addition to its conical movement about the axis X'X caused by the action of the magnetic forces, a slow movement of rotation about its own axis O'O, the angular speed of which is divided, with respect to $\omega$, by the ratio $$\frac{\sin\phi' - \alpha}{\sin\phi' - \sin(\phi' - \alpha)}$$

This movement of rotation about O'O is converted to a movement of rotation about the axis X'X at reduced speed by the cooperation of a crown fast with the rotor cage 21 nd a pinion 39 fast with the shaft 5, these two members 38-39 having a conical surface of half apex angle $\phi$ different from $\phi'$ and the axes of the crowns 32 and 38 being coincident with O'O.

It can be shown that the speed of the shaft is, with respect to $\omega$, multiplied by $$= \frac{\sin(\phi' - \alpha)}{\sin\phi'} \cdot \frac{\sin\phi}{\sin(\phi - \alpha)} - 1$$

By way of example, for $\phi = 30°$, $\phi' = 45°$ and $\alpha = 3°$, one finds that $\rho = 0.0465$.

Obviously the manners of construction described and shown are not limitative. The rotor in particular could be external of the stator.

We claim:

1. Motor comprising a rotor, of generally cylindrical shape, a stator of generally cylindrical shape having at each extremity a plurality of poles defining with the corresponding extremity of the rotor which is disposed at the interior of the stator, a corresponding plurality of gaps, a stator winding energised and arranged to generate a radial rotating field of the same direction in the gaps of the two respective extremities and means for polarising magnetically the two extremities of the rotor with opposite polarities, in such a manner that each of these latter has a magnetic centre, the virtual axis which joins these two magnetic centres cutting the axis of symmetry of the stator at the centre of symmetry of this latter, characterised by mechanical means, comprising at least one eccentric element (respectively 6 or 35) mounted on the shaft (5), or respectively in the cage of the rotor (21) for maintaining at a constant value the angle of inclination of the said virtual axis with respect to the axis of symmetry of the stator, and the coincidence of the centres of symmetry of these two axes, the said means cooperating with at least one member (respectively 7 or 36) interposed between the eccentric element and the cage of the rotor, or respectively between the eccentric element and the cage of the rotor, or respectively between eccentric element and the shaft permitting the conical movement of the said virtual axis about the said centre of symmetry and according to the said angle without driving any part of the rotor about its axis.

2. Motor according to claim 1 characterised in that the said member is a universal bearing.

3. Motor according to claim 1 or 2, characterised in that the said means comprising a second eccentric element, these two eccentric elements (6, 6a) each cooperating with a universal bearing (7, 7a).

4. Motor according to claim 1 or 2 characterised in that said means comprise a bearing of which a cage (3 or 34 respectively), perpendicular to the axis of the rotor, is fast with the median region of the surface of the rotor and centred with the centre of symmetry and of which the other cage (4 or 33 respectively) is perpendicular to the shaft (5).

5. Motor according to claim 3 characterised in that the two eccentric elements (6, 6a) are mounted on the shaft (5) with their eccentricities in opposition, and the universal bearings (7, 7a) have an external cage (7, 7a) fast with the cage (21) of the rotor.

6. Motor according to claim 4 characterised in that the said bearing has an internal cage (3) mounted on the external surface of the cage (21) and an external cage (4) fast with the stator.

7. Motor according to claim 1 or 2 in which the eccentric element or elements (35) are mounted in the cage (21) of the stator, the universal bearing or bearings (36) being mounted on the shaft (5), characterised by means for driving the shaft (5) comprising at least one conical pinion (28, 39) centred on the shaft (5) and cooperating with a toothed crown (26,38), the apices of the basic cones of the pinion and of the crown coinciding with the said centre of symmetry and their half apex angle differing from an angle equal to said angle of inclination.

8. Motor according to claim 7, characterised in that means (29, 31) are provided to prevent rotation of the rotor about itself, whilst permitting its conical movement.

9. Motor according to claim 7, characterised in that the means for driving the shaft (5) comprise a second conical pinion (37) fast with the stator and cooperating with a second conical toothed crown (32) fast with the rotor, the second pinion and the second crown having basic cons of which the apex coincides with said centre of symmetry, the axis of the second crown coinciding with that of the first, but the apex angles of the two basic cones of the two crowns being different.

10. Motor according to one of claims 1 to 9, characterised by magnetic means for polarisation of the rotor which block the conical movement of the rotor and the rotation of the axis of the motor as soon as the excitation is terminated.

11. Motor according to one of claims 1 to 9, characterised in that the said means for magnetic polarisation of the rotor comprise two crowns of magnets having radial magnetisation respectively mounted at the two extremities of the stator and magnetised in opposite sense.

12. Motor according to claim 11 characterised in that the two crowns of magnets are mounted between an external sleeve of magnetic material which extends along the entire length of the stator and two respective stacks of magnetic plates forming a plurality of poles at each extremity of the stator.

* * * * *